United States Patent
Hu et al.

(10) Patent No.: US 11,568,737 B2
(45) Date of Patent: Jan. 31, 2023

(54) DATA TRANSMISSION METHOD, APPARATUS AND SYSTEM

(71) Applicant: AUTEL ROBOTICS CO., LTD., Guangdong (CN)

(72) Inventors: Xiaojun Hu, Guangdong (CN); Hong Liu, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 144 days.

(21) Appl. No.: 16/988,344

(22) Filed: Aug. 7, 2020

(65) Prior Publication Data

US 2020/0402390 A1    Dec. 24, 2020

Related U.S. Application Data

(63) Continuation of application No. PCT/CN2018/110616, filed on Oct. 17, 2018.

(30) Foreign Application Priority Data

Feb. 9, 2018    (CN) .......................... 201810133697.8

(51) Int. Cl.
*H04J 3/00* (2006.01)
*G08C 17/02* (2006.01)
(Continued)

(52) U.S. Cl.
CPC .............. *G08C 17/02* (2013.01); *H04B 1/005* (2013.01); *H04B 7/18506* (2013.01);
(Continued)

(58) Field of Classification Search
CPC .............. G08C 17/02; G08C 2201/50; G08C 2201/61; G08C 2201/20; G08C 2201/93;
(Continued)

(56) References Cited

U.S. PATENT DOCUMENTS

| 5,414,431 A | * | 5/1995 | McCoskey | ............. | H04B 7/208 |
| | | | | | 342/352 |
| 6,134,226 A | * | 10/2000 | Reed | ................... | H04W 72/048 |
| | | | | | 370/328 |

(Continued)

FOREIGN PATENT DOCUMENTS

| CN | 102740409 A | 10/2012 |
| CN | 103167585 A | 6/2013 |

(Continued)

OTHER PUBLICATIONS

International Search Report dated Jan. 4, 2019; PCT/CN2018/110616.

*Primary Examiner* — Stephen M D Agosta

(57) ABSTRACT

The present invention provides a data transmission method, apparatus and system. The method includes: in a detection period, receiving a first pilot signal sent by an unmanned aerial vehicle (UAV), the first pilot signal being a downlink signal obtained by modulating a useful signal at a preset candidate frequency, and the preset candidate frequency including a frequency in a same frequency band and/or different frequency bands; determining a downlink operating frequency from the preset candidate frequency according to the first pilot signal; sending a first feedback signal to the UAV, the first feedback signal including information about the downlink operating frequency; and receiving downlink data sent by the UAV and modulated at the downlink operating frequency. In this way, frequency detection in a same frequency band and/or across frequency bands is implemented to select an optimal preset candidate frequency as an operating frequency, so that data transmission between a UAV and a remote control is more stable, interference from an external signal is reduced, and quality of data transmission between the UAV and a ground end is improved.

3 Claims, 5 Drawing Sheets

(51) Int. Cl.
*H04B 1/00* (2006.01)
*H04B 7/185* (2006.01)
*H04L 5/00* (2006.01)
*H04L 5/14* (2006.01)

(52) U.S. Cl.
CPC ............ *H04L 5/006* (2013.01); *H04L 5/0048* (2013.01); *H04L 5/1469* (2013.01); *G08C 2201/50* (2013.01)

(58) Field of Classification Search
CPC .. H04B 1/005; H04B 7/18506; H04B 7/0408; H04B 7/12; H04B 7/0848; H04B 17/345; H04L 5/0048; H04L 5/006; H04L 5/1469; H04W 48/16; H04W 48/18
See application file for complete search history.

(56) References Cited

U.S. PATENT DOCUMENTS

| | | | | |
|---|---|---|---|---|
| 6,377,585 | B1* | 4/2002 | Funderburk | H04B 1/7085 370/343 |
| 6,608,523 | B1* | 8/2003 | Ly | H03F 1/3235 330/132 |
| 9,529,360 | B1* | 12/2016 | Melamed | H04K 3/46 |
| 10,574,338 | B1* | 2/2020 | Chang | H04W 4/44 |
| 11,431,406 | B1* | 8/2022 | Guthrie | H04W 24/04 |
| 2012/0330481 | A1* | 12/2012 | Feldkamp | G05D 1/0022 701/2 |
| 2013/0229955 | A1* | 9/2013 | Xu | H04B 17/101 370/280 |
| 2015/0236779 | A1* | 8/2015 | Jalali | H04W 16/28 342/367 |
| 2015/0304885 | A1* | 10/2015 | Jalali | H04B 7/18504 370/329 |
| 2016/0105233 | A1* | 4/2016 | Jalali | H01Q 3/08 342/359 |
| 2017/0041763 | A1* | 2/2017 | Jalali | H04W 64/003 |
| 2017/0093519 | A1* | 3/2017 | Deng | H04B 10/548 |
| 2017/0288772 | A1* | 10/2017 | Li | H04L 5/0048 |
| 2017/0325221 | A1* | 11/2017 | Jalali | H04W 16/28 |
| 2017/0374707 | A1* | 12/2017 | Dai | H01Q 1/3216 |
| 2018/0081354 | A1* | 3/2018 | Magy | H04K 3/45 |

FOREIGN PATENT DOCUMENTS

| | | |
|---|---|---|
| CN | 103178927 A | 6/2013 |
| CN | 107634816 A | 1/2018 |
| CN | 108390748 A | 8/2018 |

* cited by examiner

DATA TRANSMISSION METHOD, APPARATUS AND SYSTEM

This application is a continuation application of International Application No. PCT/CN2018/110616, filed on Oct. 17, 2018, which claims priority of Chinese Patent Application No. 201810133697.8, filed on Feb. 9, 2018, which is incorporated herein by reference in its entirely.

BACKGROUND

Technical Field

The present invention relates to the field of communication technologies, and in particular, to a data transmission method, apparatus and system.

Related Art

An unmanned aerial vehicle is abbreviated as "UAV", and is an unmanned aircraft operated by a radio remote control device and a self-provided program control apparatus. The UAV is responsible for tasks such as ground monitoring, target tracking, and military strikes, and play an extremely important role in the military and civilian fields because of a small size and strong flexibility. Performance of a transmission link of the UAV directly determines safety and flight efficiency of a mission of the UAV. The transmission link of the UAV may be divided into an uplink and a downlink according to different data transmission directions. The uplink mainly completes sending of a remote control instruction from a ground end to the UAV to implement real-time control of flight attitude and command automation. The downlink mainly completes transmission of information such as telemetry data and a TV reconnaissance image from the UAV to the ground end.

Currently, a single-band wireless transmission link or a dual-band wireless transmission link is mainly used for data transmission between the UAV to the ground end. In a single-band wireless transmission link, checking and noise measurement are performed on a signal in a frequency band to select appropriate frequency hopping. In a dual-band wireless transmission link, only one of frequency bands can be selected for checking and noise measurement to select appropriate frequency hopping.

However, when the UAV transmits data to the ground end, the data transmission is prone to interference from an external signal, resulting in instability of a wireless transmission link and affecting quality of the data transmission between the UAV and the ground end.

SUMMARY

The present invention provides a data transmission method, apparatus and system, to improve stability of a wireless transmission link between a UAV and a ground end.

In a first aspect, an embodiment of the present invention provides a data transmission method, including:
  in a detection period, receiving a first pilot signal sent by a UAV, the first pilot signal being a downlink signal obtained by modulating a useful signal at a preset candidate frequency, and the preset candidate frequency including a frequency in a same frequency band and/or different frequency bands;
  determining a downlink operating frequency from the preset candidate frequency according to the first pilot signal;
  sending a first feedback signal to the UAV, the first feedback signal including information about the downlink operating frequency; and receiving downlink data sent by the UAV and modulated at the downlink operating frequency.

Optionally, the same frequency band and/or different frequency bands include/includes more than one frequency band of 2.4 GHz, 900 MHz and 5.8 GHz.

Optionally, the determining a downlink operating frequency from the preset candidate frequency according to the first pilot signal includes:
  obtaining a power and a noise power of the useful signal in the first pilot signal to obtain a signal-to-noise ratio of the preset candidate frequency corresponding to the first pilot signal; and using a preset candidate frequency with a maximum signal-to-noise ratio in the preset candidate frequency corresponding to the first pilot signal as the downlink operating frequency.

In a second aspect, an embodiment of the present invention provides a data transmission method, including:
  in a detection period, receiving a second pilot signal sent by a remote control, the second pilot signal being an uplink signal obtained by modulating a useful signal at a preset candidate frequency, and the preset candidate frequency including a frequency in a same frequency band and/or different frequency bands;
  determining an uplink operating frequency from the preset candidate frequency according to the second pilot signal;
  sending a second feedback signal to the remote control, the second feedback signal including information about the uplink operating frequency; and
  receiving uplink data sent by the remote control and modulated at the uplink operating frequency.

Optionally, the same frequency band and/or different frequency bands include/includes more than one frequency band of 2.4 GHz, 900 MHz and 5.8 GHz.

Optionally, the determining an uplink operating frequency from the preset candidate frequency according to the second pilot signal includes:
  obtaining a power and a noise power of the useful signal in the second pilot signal to obtain a signal-to-noise ratio of the preset candidate frequency corresponding to the second pilot signal; and
  using a preset candidate frequency with a maximum signal-to-noise ratio in the preset candidate frequency corresponding to the second pilot signal as the uplink operating frequency.

In a third aspect, an embodiment of the present invention provides a data transmission method, including:
  sending, by a UAV, a first pilot signal to a remote control in a detection period, the first pilot signal being a downlink signal obtained by modulating a useful signal at a preset candidate frequency, and the preset candidate frequency including a frequency in a same frequency band and/or different frequency bands;
  receiving, by the remote control, the first pilot signal sent by the UAV, and determining a downlink operating frequency from the preset candidate frequency according to the first pilot signal;
  sending, by the remote control, a first feedback signal to the UAV, the first feedback signal including information about the downlink operating frequency; and
  receiving, by the UAV, the first feedback signal sent by the remote control, modulating downlink data at the downlink operating frequency, and sending the modulated downlink data to the remote control.

Optionally, the sending, by a UAV, a first pilot signal to a remote control in a detection period includes:

determining the preset candidate frequency;

modulating the useful signal at the preset candidate frequency to obtain the first pilot signal corresponding to the preset candidate frequency;

determining duration of the detection period and a sending time interval of each first pilot signal according to a quantity of preset candidate frequencies; and sending the first pilot signal to the remote control in the detection period according to the sending time interval of each first pilot signal.

Optionally, the determining the preset candidate frequency includes:

selecting at least two preset candidate frequencies from a same frequency band and/or different frequency bands, where each frequency band corresponds to one independent communication link a time division duplex mode being adopted for communication on the communication link.

Optionally, the same frequency band and/or different frequency bands include/includes more than one frequency band of 2.4 GHz, 900 MHz and 5.8 GHz.

Optionally, the downlink operating frequency is a preset candidate frequency corresponding to a first pilot signal with a maximum signal-to-noise ratio in the first pilot signal received by the remote control in the detection period.

In a fourth aspect, an embodiment of the present invention provides a data transmission method, including:

sending, by a remote control, a second pilot signal to a UAV in a detection period, the second pilot signal being an uplink signal obtained by modulating a useful signal at a preset candidate frequency, and the preset candidate frequency including a frequency in a same frequency band and/or different frequency bands;

receiving, by the UAV, the second pilot signal sent by the remote control, and determining an uplink operating frequency from the preset candidate frequency according to the second pilot signal;

sending, by the UAV, a second feedback signal to the remote control, the second feedback signal including information about the uplink operating frequency; and receiving, by the remote control, the second feedback signal sent by the UAV, modulating uplink data at the uplink operating frequency, and sending the modulated uplink data to the UAV.

Optionally, the sending, by a remote control, a second pilot signal to a UAV in a detection period includes:

determining the preset candidate frequency;

modulating the useful signal at the preset candidate frequency to obtain the second pilot signal corresponding to the preset candidate frequency;

determining duration of the detection period and a sending time interval of each second pilot signal according to a quantity of preset candidate frequencies; and sending the second pilot signal to the UAV in the detection period according to the sending time interval of each second pilot signal.

Optionally, the determining the preset candidate frequency includes:

selecting at least two preset candidate frequencies from a same frequency band and/or different frequency bands, where each frequency band corresponds to one independent communication link, a time division duplex mode being adopted for communication on the communication link.

Optionally, the same frequency band and/or different frequency bands include/includes more than one frequency band of 2.4 GHz, 900 MHz and 5.8 GHz.

Optionally, the uplink operating frequency is a preset candidate frequency corresponding to a second pilot signal with a maximum signal-to-noise ratio in the second pilot signal received by the UAV in the detection period.

In a fifth aspect, an embodiment of the present invention provides a data transmission apparatus, including:

a receiving module configured to receive, in a detection period, a first pilot signal sent by a UAV, the first pilot signal being a downlink signal obtained by modulating a useful signal at a preset candidate frequency, and the preset candidate frequency including a frequency in a same frequency band and/or different frequency bands;

a determining module configured to determine a downlink operating frequency from the preset candidate frequency according to the first pilot signal; and a sending module configured to send a first feedback signal to the UAV, the first feedback signal including information about the downlink operating frequency, and the receiving module being further configured to receive downlink data sent by the UAV and modulated at the downlink operating frequency.

Optionally, the same frequency band and/or different frequency bands include/includes more than one frequency band of 2.4 GHz, 900 MHz and 5.8 GHz.

Optionally, the determining module is specifically configured to:

obtain a power and a noise power of the useful signal in the first pilot signal to obtain a signal-to-noise ratio of the preset candidate frequency corresponding to the first pilot signal; and use a preset candidate frequency with a maximum signal-to-noise ratio in the preset candidate frequency corresponding to the first pilot signal as the downlink operating frequency.

In a sixth aspect, an embodiment of the present invention provides a data transmission apparatus, including:

a receiving module configured to receive, in a detection period, a second pilot signal sent by a remote control, the second pilot signal being an uplink signal obtained by modulating a useful signal at a preset candidate frequency, and the preset candidate frequency including a frequency in a same frequency band and/or different frequency bands;

a determining module configured to determine an uplink operating frequency from the preset candidate frequency according to the second pilot signal; and a sending module configured to send a second feedback signal to the remote control, the second feedback signal including information about the uplink operating frequency, and the receiving module being further configured to receive uplink data sent by the remote control and modulated at the uplink operating frequency.

Optionally, the same frequency band and/or different frequency bands include/includes more than one frequency band of 2.4 GHz, 900 MHz and 5.8 GHz.

Optionally, the determining module is specifically configured to:

obtain a power and a noise power of the useful signal in the second pilot signal to obtain a signal-to-noise ratio of the preset candidate frequency corresponding to the second pilot signal; and use a preset candidate frequency with a maximum signal-to-noise ratio in the preset candidate frequency corresponding to the second pilot signal as the uplink operating frequency.

In a seventh aspect, an embodiment of the present invention provides a data transmission system, including: a UAV and a remote control, the UAV being configured to perform the method in any of the above second aspect, and the remote control being configured to perform the method in any one of the above first aspect.

In an eighth aspect, an embodiment of the present invention provides a data transmission device, including:

a memory configured to store a program;

a processor configured to execute the program stored in the memory, when the program is executed, the processor being configured to perform the method in any of the first aspect.

In a ninth aspect, an embodiment of the present invention provides a data transmission device, including:

a memory configured to store a program;

a processor configured to execute the program stored in the memory, when the program is executed, the processor being configured to perform the method in any of the second aspect.

In a tenth aspect, an embodiment of the present invention provides a computer readable storage medium, including an instruction that, when run on a computer, causes a computer to perform the method in any of the first aspect.

In an eleventh aspect, an embodiment of the present invention provides a computer readable storage medium, including an instruction that, when run on a computer, causes a computer to perform the method in any of the second aspect.

According to the data transmission method, apparatus and system provided in the present invention, the first pilot signal sent by the UAV is received in the detection period, the first pilot signal being a downlink signal obtained by modulating the useful signal at the preset candidate frequency, and the preset candidate frequency including a frequency in a same frequency band and/or different frequency bands; the downlink operating frequency is determined from the preset candidate frequency according to the first pilot signal; the first feedback signal is sent to the UAV, the first feedback signal including the information about the downlink operating frequency; and the downlink data sent by the UAV and modulated at the downlink operating frequency is received. In this way, frequency detection in a same frequency band and/or across frequency bands is implemented to select an optimal preset candidate frequency as an operating frequency, so that data transmission between a UAV and a remote control is more stable, interference from an external signal is reduced, and quality of data transmission between the UAV and a ground end is improved.

BRIEF DESCRIPTION OF THE DRAWINGS

To more clearly describe the technical solutions in the embodiments of this application or in the prior art, the following will briefly introduce the drawings required for describing the embodiments or the prior art. It is apparent that the drawings in the following description are only some embodiments described in the present invention, and a person of ordinary skill in the art may obtain other drawings on the basis of these drawings without any creative effort.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are merely some embodiments of the present application rather than all of the embodiments. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects rather than describe a specific order or sequence. It should be understood that the data used in such a way are interchangeable in proper circumstances so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those steps or units that are expressly listed, but may include other steps or units not expressly listed or inherent to such a process, method, system, product, or device.

The following describes technical solutions of the present invention in detail with reference to specific embodiments. The following specific embodiments may be mutually combined, and same or similar concepts or processes may not be repeatedly described in some embodiments.

In the following, some terms in this application are described, so as to help a person skilled in the art has a better understanding.

(1) A UAV, short for an unmanned aerial vehicle, is an unmanned aircraft operated by a radio remote control device and a self-provided program control apparatus.

(2) Time division duplex means that uplink and downlink channels use a same frequency. In a time division duplex mode, transmission of information in an uplink and a downlink may be performed in a same carrier frequency, that is, the transmission of the information in the uplink and the downlink is implemented on a same carrier through time division.

(3) A signal-to-noise ratio is a parameter describing a proportional relationship between an effective component and a noise component in a signal. Different application fields have different specific definitions. A relatively common signal-to-noise ratio may be: a ratio of a rated maximum signal power to a static noise power when there is no signal, or a ratio of a power of the effective component to a power of the noise component in the signal, and a unit is dB.

Figure 1:
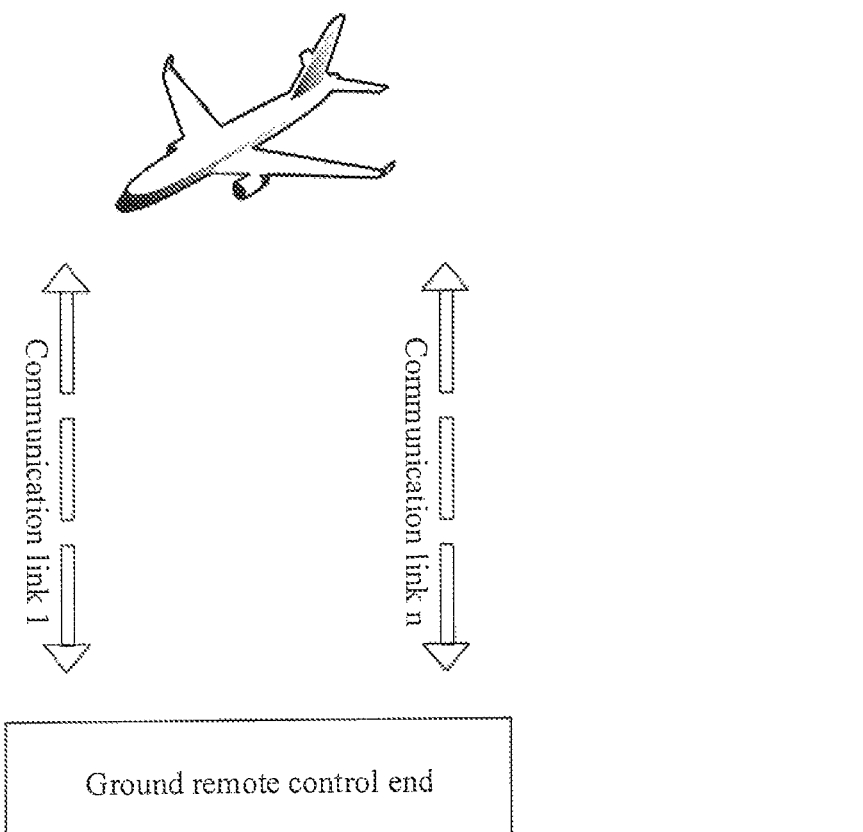
FIG. 1 is a schematic diagram of a first application scenario according to the present invention.

A data transmission method provided in the present invention can improve stability of a wireless transmission link between a UAV and a ground end. FIG. 1 is a schematic diagram of a first application scenario according to the present invention. As shown in FIG. 1, data is transmitted between a UAV and a ground remote control end through n mutually independent communication links, where n is a natural number greater than or equal to 2. Each communication link adopts a single-transmit and dual-receive operating mode, so that downlink data can be sent and uplink data can be received. Specifically, in a detection period, the UAV may send a first pilot signal to a remote control (which may be a detection signal sent by the UAV to the remote control) through any communication link, and receive a second pilot signal sent by the remote control (which may be a detection signal sent by the remote control to the UAV). The first pilot signal and the second pilot signal may be transmitted on a same communication link or different communication links. The remote control may determine a downlink operating frequency according to signal-to-noise ratios of different frequencies in the received first pilot signal. The UAV may determine an uplink operating frequency according to signal-to-noise ratios of different frequencies in the received second pilot signal. After the uplink operating frequency and the downlink operating frequency are determined, the UAV may receive, through a communication link corresponding to a frequency band on which the uplink operating frequency is located, uplink data sent by the remote control. The remote control may receive, through a communication link corresponding to a frequency band on which the downlink operating frequency is located, downlink data sent by the UAV.

The technical solutions of the present invention and how the technical solutions of the present application resolve the above technical problems are described in detail below with specific embodiments. The following several specific embodiments may be combined with each other, and a same or similar concept or process may not be described repeatedly in some embodiments. The following describes the embodiments of the present invention with reference to the accompanying drawings.

Figure 2:
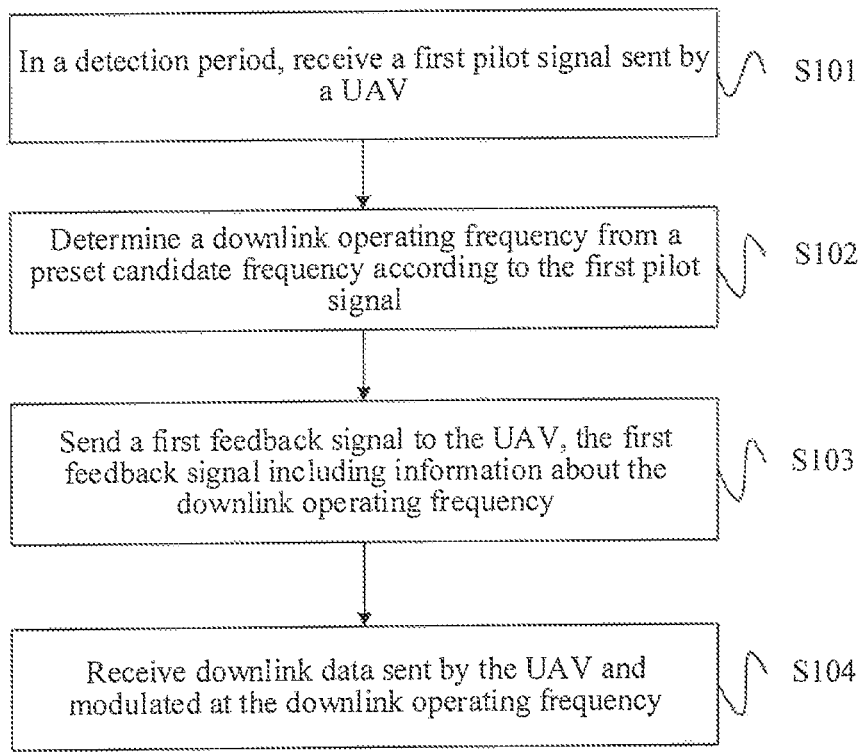
FIG. 2 is a flowchart of a data transmission method according to Embodiment 1 of the present invention.

FIG. 2 is a flowchart of a data transmission method according to Embodiment 1 of the present invention. As shown in FIG. 2, the method in this embodiment may include the following steps.

S101. In a detection period, receive a first pilot signal sent by a UAV.

In this embodiment, the UAV may first determine a preset candidate frequency; modulate a useful signal at the preset candidate frequency to obtain a first pilot signal corresponding to the preset candidate frequency; determine duration of the detection period and a sending time interval of each first pilot signal according to a quantity of preset candidate frequencies; and send the first pilot signal to a remote control in the detection period according to the sending time interval of each first pilot signal. The first pilot signal is a downlink signal obtained by modulating the useful signal at the preset candidate frequency, and the preset candidate frequency includes a frequency in a same frequency band and/or different frequency bands. The determining a preset candidate frequency may be selecting at least two preset candidate frequencies from a same frequency band and/or different frequency bands. The same frequency band and/or different frequency bands include/includes more than one frequency band of 2.4 GHz, 900 MHz and 5.8 GHz. Each frequency band corresponds to one independent communication link, a time division duplex mode being adopted for communication on the communication link. Taking two communication links as an example, one of the two communication links has a frequency band of 2.4 GHz and the other has a frequency band of 900 MHz. By applying the method in this embodiment, several preset candidate frequencies may be selected in the frequency band of 2.4 GHz, or several preset candidate frequencies may be selected in the frequency band of 900 MHz. It should be noted that a quantity of selected preset candidate frequencies and a detection order of the selected preset candidate frequencies are not limited in this embodiment. In addition, a quantity of communication links may be increased or decreased according to a quantity of applicable frequency bands.

S102. Determine a downlink operating frequency from the preset candidate frequency according to the first pilot signal.

Optionally, a power and a noise power of the useful signal in the first pilot signal are obtained to obtain a signal-to-noise ratio of the preset candidate frequency corresponding to the first pilot signal; and a preset candidate frequency with a maximum signal-to-noise ratio in the preset candidate frequency corresponding to the first pilot signal is used as the downlink operating frequency.

In this embodiment, the remote control detects and analyzes each received first pilot signal to obtain the power and the noise power of the useful signal in the first pilot signal, and then obtains the signal-to-noise ratio of the preset candidate frequency corresponding to the first pilot signal according to a ratio of the power to the noise power of the useful signal in the first pilot signal. After obtaining signal-to-noise ratios of preset candidate frequencies corresponding to all first pilot signals in the detection period, the remote control selects the preset candidate frequency with the maximum signal-to-noise ratio in the preset candidate frequency corresponding to the first pilot signal as the downlink operating frequency.

S103. Send a first feedback signal to the UAV, the first feedback signal including information about the downlink operating frequency.

In this embodiment, the remote control sends the first feedback signal to the UAV after determining the downlink operating frequency, the first feedback signal including the information about the downlink operating frequency, which is used to instruct the UAV to send downlink data according to the downlink operating frequency.

S104. Receive downlink data sent by the UAV and modulated at the downlink operating frequency.

In this embodiment, the first pilot signal sent by the UAV is received in the detection period, the first pilot signal being a downlink signal obtained by modulating the useful signal at the preset candidate frequency, and the preset candidate frequency including a frequency in a same frequency band and/or different frequency bands; the downlink operating frequency is determined from the preset candidate frequency according to the first pilot signal; the first feedback signal is sent to the UAV, the first feedback signal including the information about the downlink operating frequency; and the downlink data sent by the UAV and modulated at the downlink operating frequency is received. In this way, frequency detection in a same frequency band and/or across frequency bands is implemented to select an optimal preset candidate frequency as an operating frequency, so that data transmission between a UAV and a remote control is more stable, interference from an external signal is reduced, and quality of data transmission between the UAV and a ground end is improved.

In this embodiment, the first pilot signal sent by the UAV is received in the detection period, the first pilot signal being a downlink signal obtained by modulating the useful signal at the preset candidate frequency, and the preset candidate frequency including a frequency in a same frequency band and/or different frequency bands; the downlink operating frequency is determined from the preset candidate frequency according to the first pilot signal; the first feedback signal is sent to the UAV, the first feedback signal including the information about the downlink operating frequency; and the downlink data sent by the UAV and modulated at the downlink operating frequency is received. In this way, frequency detection in a same frequency band and/or across frequency bands is implemented to select an optimal preset candidate frequency as an operating frequency, so that data transmission between a UAV and a remote control is more stable, interference from an external signal is reduced, and quality of data transmission between the UAV and a ground end is improved.

Figure 3:
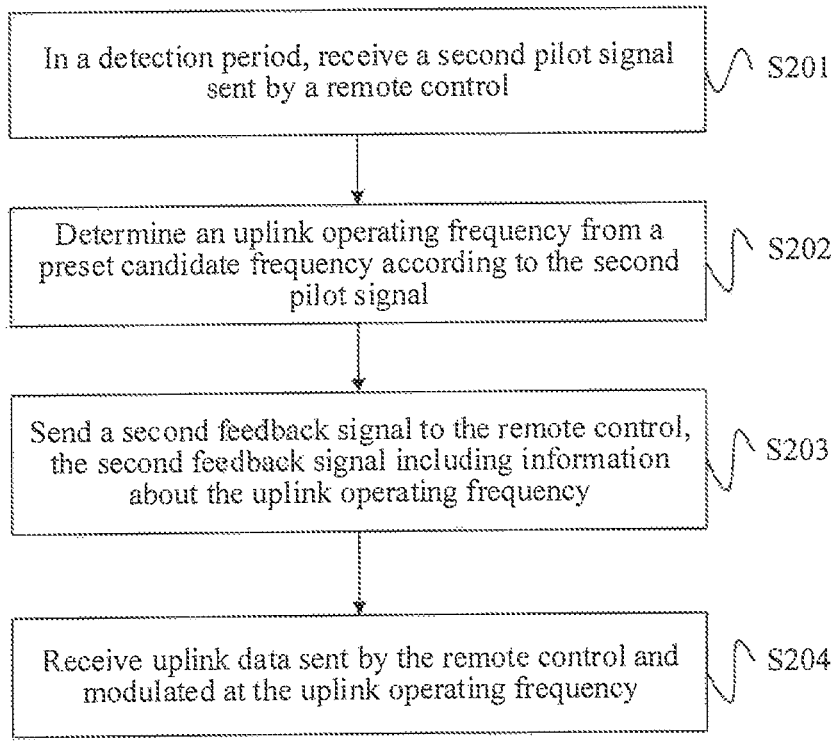
FIG. 3 is a flowchart of a data transmission method according to Embodiment 2 of the present invention.

FIG. 3 is a flowchart of a data transmission method according to Embodiment 2 of the present invention. As shown in FIG. 3, the method in this embodiment may include the following steps.

S201. In a detection period, receive a second pilot signal sent by a remote control.

In this embodiment, a remote control may first determine a preset candidate frequency; modulate a useful signal at the preset candidate frequency to obtain a second pilot signal corresponding to the preset candidate frequency; determine duration of the detection period and a sending time interval of each second pilot signal according to a quantity of preset candidate frequencies; and send the second pilot signal to a UAV in the detection period according to the sending time interval of each second pilot signal. The determining a preset candidate frequency may be selecting at least two preset candidate frequencies from a same frequency band and/or different frequency bands. The same frequency band and/or different frequency bands include/includes more than one frequency band of 2.4 GHz, 900 MHz and 5.8 GHz. Each frequency band corresponds to one independent communication link, a time division duplex mode being adopted for communication on the communication link. Taking two communication links as an example, one of the two communication links has a frequency band of 2.4 GHz and the other has a frequency band of 900 MHz. By applying the method in this embodiment, several preset candidate frequencies may be selected in the frequency band of 2.4 GHz, or several preset candidate frequencies may be selected in the frequency band of 900 MHz. It should be noted that a quantity of selected preset candidate frequencies and a detection order of the selected preset candidate frequencies are not limited in this embodiment. In addition, a quantity of communication links may be increased or decreased according to a quantity of applicable frequency bands.

S202. Determine an uplink operating frequency from the preset candidate frequency according to the second pilot signal.

Optionally, a power and a noise power of the useful signal in the second pilot signal are obtained to obtain a signal-to-noise ratio of the preset candidate frequency corresponding to the second pilot signal; and a preset candidate frequency with a maximum signal-to-noise ratio in the preset candidate frequency corresponding to the second pilot signal is used as the uplink operating frequency.

In this embodiment, the UAV detects and analyzes each received pilot signal to obtain the power and the noise power of the useful signal in the second pilot signal, and then obtains the signal-to-noise ratio of the preset candidate frequency corresponding to the second pilot signal according to a ratio of the power to the noise power of the useful signal in the second pilot signal. After obtaining signal-to-noise ratios of preset candidate frequencies corresponding to all second pilot signals in the detection period, the UAV selects the preset candidate frequency with the maximum signal-to-noise ratio in the preset candidate frequency corresponding to the second pilot signal as the uplink operating frequency.

S203. Send a second feedback signal to the remote control, the second feedback signal including information about the uplink operating frequency.

In this embodiment, the UAV sends the second feedback signal to the remote control after determining the uplink operating frequency, the second feedback signal including the information about the uplink operating frequency, which is used to instruct the remote control to send uplink data according to the uplink operating frequency.

S204. Receive uplink data sent by the remote control and modulated at the uplink operating frequency.

In this embodiment, the UAV receives the uplink data sent by the remote control and modulated at the uplink operating frequency, and the uplink data mainly includes a control instruction sent by the remote control.

In this embodiment, the second pilot signal sent by the remote control is received in the detection period, the second pilot signal being an uplink signal obtained by modulating the useful signal at the preset candidate frequency, and the preset candidate frequency including a frequency in a same frequency band and/or different frequency bands; the uplink operating frequency is determined from the preset candidate frequency according to the second pilot signal; the second feedback signal is sent to the remote control, the second feedback signal including the information about the uplink operating frequency; and the uplink data sent by the remote control and modulated at the uplink operating frequency is received. In this way, frequency detection in a same frequency band and/or across frequency bands is implemented to select an optimal preset candidate frequency as an operating frequency, so that data transmission between a UAV and a remote control is more stable, interference from an external signal is reduced, and quality of data transmission between the UAV and a ground end is improved.

Figure 4:
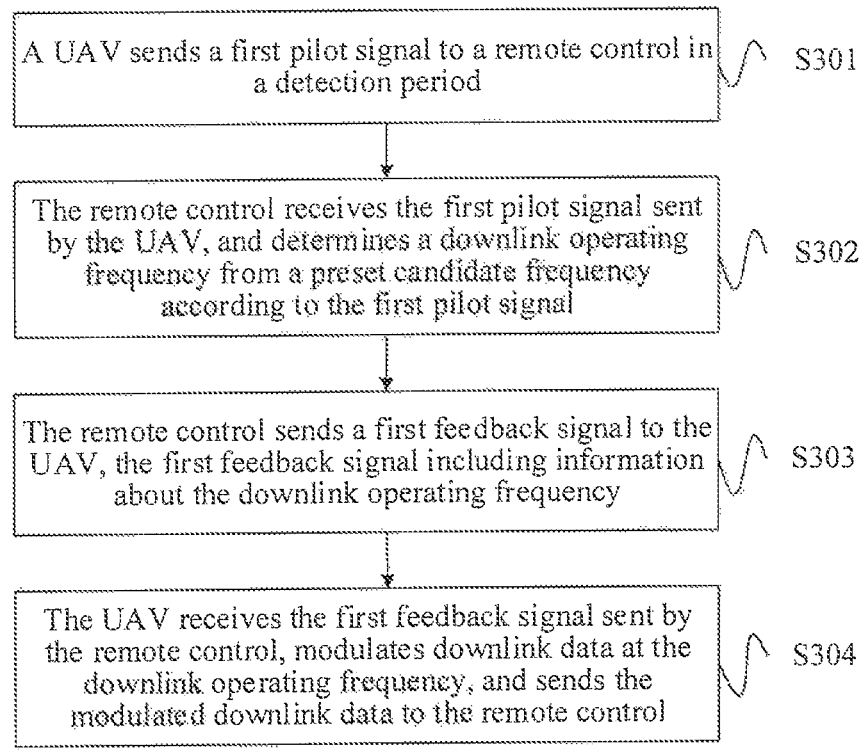
FIG. 4 is a flowchart of a data transmission method according to Embodiment 3 of the present invention.

FIG. 4 is a flowchart of a data transmission method according to Embodiment 3 of the present invention. As shown in FIG. 4, the method in this embodiment may include the following steps.

S301. A UAV sends a first pilot signal to a remote control in a detection period.

In this embodiment, the UAV may first determine a preset candidate frequency; modulate a useful signal at the preset candidate frequency to obtain a first pilot signal corresponding to the preset candidate frequency; determine duration of the detection period and a sending time interval of each first pilot signal according to a quantity of preset candidate frequencies; and send the first pilot signal to a remote control in the detection period according to the sending time interval of each first pilot signal. The first pilot signal is a downlink signal obtained by modulating the useful signal at the preset candidate frequency, and the preset candidate frequency includes a frequency in a same frequency band and/or different frequency bands. The determining a preset candidate frequency may be selecting a plurality of preset candidate frequencies from a same frequency band and/or different frequency bands. The same frequency band and/or different frequency bands include/includes more than one frequency band of 2.4 GHz, 900 MHz and 5.8 GHz. Each frequency band corresponds to one independent communication link, a time division duplex mode being adopted for communication on the communication link. Taking two communication links as an example, one of the two communication links has a frequency band of 2.4 GHz and the other has a frequency band of 900 MHz. By applying the method in this embodiment, several preset candidate frequencies may be selected in the frequency band of 2.4 GHz, or several preset candidate frequencies may be selected in the frequency band of 900 MHz. It should be noted that a quantity of selected preset candidate frequencies and a detection order of the selected preset candidate frequencies are not limited in this embodiment. In addition, a quantity of communication links may be increased or decreased according to a quantity of applicable frequency bands.

S302. The remote control receives the first pilot signal sent by the UAV, and determines a downlink operating frequency from the preset candidate frequency according to the first pilot signal.

Optionally, a power and a noise power of the useful signal in the first pilot signal are obtained to obtain a signal-to-noise ratio of the preset candidate frequency corresponding to the first pilot signal; and a preset candidate frequency with a maximum signal-to-noise ratio in the preset candidate frequency corresponding to the first pilot signal is used as the downlink operating frequency.

In this embodiment, the remote control detects and analyzes each received first pilot signal to obtain the power and the noise power of the useful signal in the first pilot signal, and then obtains the signal-to-noise ratio of the preset candidate frequency corresponding to the first pilot signal according to a ratio of the power to the noise power of the useful signal in the first pilot signal. After obtaining signal-to-noise ratios of preset candidate frequencies corresponding to all first pilot signals in the detection period, the remote control selects the preset candidate frequency with the maximum signal-to-noise ratio in the preset candidate frequency corresponding to the first pilot signal as the downlink operating frequency.

S303. The remote control sends a first feedback signal to the UAV, the first feedback signal including information about the downlink operating frequency.

In this embodiment, the remote control sends the first feedback signal to the UAV after determining the downlink operating frequency, the first feedback signal including the information about the downlink operating frequency, which is used to instruct the UAV to send downlink data according to the downlink operating frequency.

S304. The UAV receives the first feedback signal sent by the remote control, modulating downlink data at the downlink operating frequency, and sending the modulated downlink data to the remote control.

In this embodiment, the first pilot signal sent by the UAV is received in the detection period, the first pilot signal being a downlink signal obtained by modulating the useful signal at the preset candidate frequency, and the preset candidate frequency including a frequency in a same frequency band and/or different frequency bands; the downlink operating frequency is determined from the preset candidate frequency according to the first pilot signal; the first feedback signal is sent to the UAV, the first feedback signal including the information about the downlink operating frequency; and the downlink data sent by the UAV and modulated at the downlink operating frequency is received. In this way, frequency detection in a same frequency band and/or across frequency bands is implemented to select an optimal preset candidate frequency as an operating frequency, so that data transmission between a UAV and a remote control is more stable, interference from an external signal is reduced, and quality of data transmission between the UAV and a ground end is improved. It should be noted that transmission of uplink data and downlink data in this embodiment may be simultaneously performed. While sending the first pilot signal to the remote control, the UAV can also receive the second pilot signal of the remote control. The determining of the downlink operating frequency and the determining of the uplink operating frequency are two independent processes. Therefore, an execution order of the two processes is not limited in this embodiment.

Figure 5:
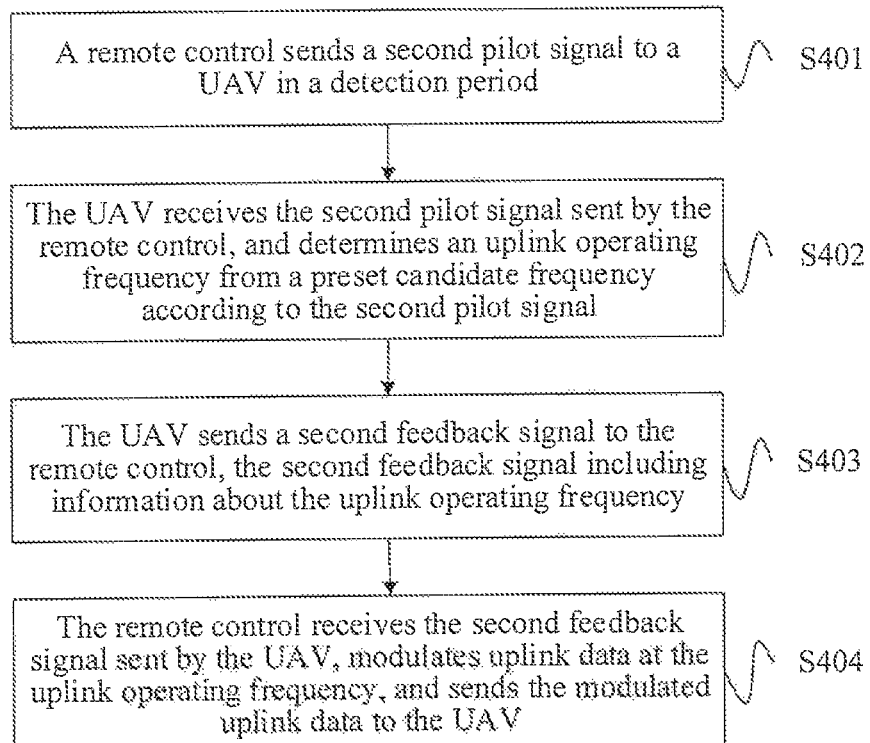
FIG. 5 is a flowchart of a data transmission method according to Embodiment 4 of the present invention.

FIG. 5 is a flowchart of a data transmission method according to Embodiment 4 of the present invention. As shown in FIG. 5, the method in this embodiment may include the following steps.

S401. A remote control sends a second pilot signal to a UAV in a detection period.

Optionally, a preset candidate frequency may be first determined; a useful signal is modulated at the preset candidate frequency to obtain a second pilot signal corresponding to the preset candidate frequency; duration of the detection period and a sending time interval of each second pilot signal are determined according to a quantity of preset candidate frequencies; and the second pilot signal is sent to the UAV in the detection period according to the sending time interval of each second pilot signal.

In this embodiment, the second pilot signal is an uplink signal obtained by modulating the useful signal at the preset candidate frequency, and the preset candidate frequency includes a frequency in a same frequency band and/or different frequency bands. The useful signal may be a detection signal sent by the remote control to the UAV, or may be to-be-sent uplink data. The uplink data includes a remote control instruction of the remote control, and the like. The useful signal is modulated according to the preset candidate frequency, so that the UAV can obtain a signal-to-noise ratio of the useful signal to background noise according to the received second pilot signal, thereby determining an optimal uplink operating frequency. The determining a preset candidate frequency may be selecting at least two preset candidate frequencies from a same frequency band and/or different frequency bands. The same frequency band and/or different frequency bands include/includes more than one frequency band of 2.4 GHz, 900 MHz and 5.8 GHz. Each frequency band corresponds to one independent communication link, a time division duplex mode being adopted for communication on the communication link. Taking two communication links as an example, one of the two communication links has a frequency band of 2.4 GHz and the other has a frequency band of 900 MHz. By applying the method in this embodiment, several preset candidate frequencies may be selected in the frequency band of 2.4 GHz, or several preset candidate frequencies may be selected in the frequency band of 900 MHz. It should be noted that a quantity of selected preset candidate frequencies and a detection order of the selected preset candidate frequencies are not limited in this embodiment. In addition, a quantity of communication links may be increased or decreased according to a quantity of applicable frequency bands.

S402. The UAV receives the second pilot signal sent by the remote control, and determining an uplink operating frequency from the preset candidate frequency according to the second pilot signal.

In this embodiment, the uplink operating frequency is determined by the UAV according to quality of a received pilot signal. Optionally, the uplink operating frequency may be a preset candidate frequency corresponding to a second pilot signal with a maximum signal-to-noise ratio in the second pilot signal received by the remote control in the detection period. Specifically, it is assumed that the UAV sends a pilot signal at a frequency every 2 ms. When the UAV detects that an amplitude of a frequency A is −80 dBm and background noise is −100 dBm, a signal-to-noise ratio at the frequency A is 20 dB. If the UAV detects that an amplitude of a frequency B is −90 dBm and background noise is −105 dBm after 2 ms, a signal-to-noise ratio at the frequency B is 15 dB. Because the signal-to-noise ratio of the frequency A is greater than that of the frequency B, the frequency A is selected as the uplink operating frequency. It should be noted that, in this embodiment, the frequency A and the frequency B are used as an example, but a quantity of frequencies is not limited. When pilot signals are sent at equal intervals, as the quantity of frequencies increases, a corresponding detection period is lengthened.

S403. The UAV sends a second feedback signal to the remote control, the second feedback signal including information about the uplink operating frequency.

S404. The remote control receives the second feedback signal sent by the UAV, modulates uplink data at the uplink operating frequency, and sends the modulated uplink data to the UAV.

In this embodiment, after the uplink operating frequency is determined, the remote control modulates the useful signal at the uplink operating frequency, and then sends the uplink data to the UAV through a communication link corresponding to the uplink operating frequency. The uplink data is mainly a control instruction sent by the remote control.

In this embodiment, the second pilot signal is sent to the UAV in the detection period, the second pilot signal being an uplink signal obtained by modulating the useful signal at the preset candidate frequency, and the preset candidate frequency including a frequency in a same frequency band and/or different frequency bands; the second feedback signal sent by the UAV is received, the second feedback signal including the information about the uplink operating frequency; and the uplink data is modulated at the uplink operating frequency, and the modulated uplink data is sent to the UAV. In this way, frequency detection in a same frequency band and/or across frequency bands is implemented to select an optimal preset candidate frequency as an operating frequency, so that data transmission between a UAV and a remote control is more stable, interference from an external signal is reduced, and quality of data transmission between the UAV and a ground end is improved. It should be noted that transmission of uplink data and downlink data in this embodiment may be simultaneously performed. While sending the first pilot signal to the remote control, the UAV can also receive the second pilot signal of the remote control. The determining of the downlink operating frequency and the determining of the uplink operating frequency are two independent processes. Therefore, an execution order of the two processes is not limited in this embodiment.

Figure 6:
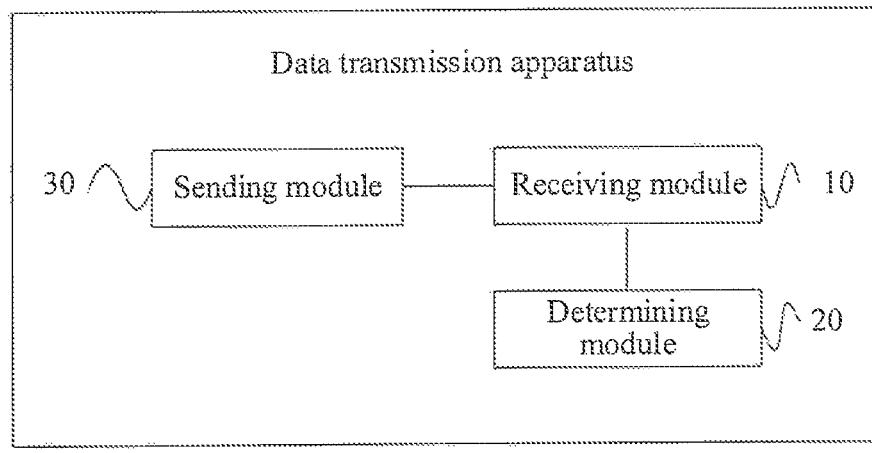
FIG. 6 is a schematic structural diagram of a data transmission apparatus according to Embodiment 5 of the present invention.

FIG. 6 is a schematic structural diagram of a data transmission apparatus according to Embodiment 5 of the present invention. As shown in FIG. 6, the apparatus in this embodiment may include:

a receiving module 10 configured to receive, in a detection period, a first pilot signal sent by a UAV, the first pilot signal being a downlink signal obtained by modulating a useful signal at a preset candidate frequency, and the preset candidate frequency including a frequency in a same frequency band and/or different frequency bands;

a determining module 20 configured to determine a downlink operating frequency from the preset candidate frequency according to the first pilot signal; and a sending module 30 configured to send a first feedback signal to the UAV, the first feedback signal including information about the downlink operating frequency, and the receiving module 10 being further configured to receive downlink data sent by the UAV and modulated at the downlink operating frequency.

Optionally, the same frequency band and/or different frequency bands include/includes more than one frequency band of 2.4 GHz, 900 MHz and 5.8 GHz.

Optionally, the determining module 20 is specifically configured to:

obtain a power and a noise power of the useful signal in the first pilot signal to obtain a signal-to-noise ratio of the preset candidate frequency corresponding to the first pilot signal; and use a preset candidate frequency with a maximum signal-to-noise ratio in the preset candidate frequency corresponding to the first pilot signal as the downlink operating frequency.

In this embodiment, the technical solution in the method shown in FIG. 2 may be implemented, and an implementation process and a technical effect thereof are similar to those of the above method. Details are not described herein again.

Figure 7:
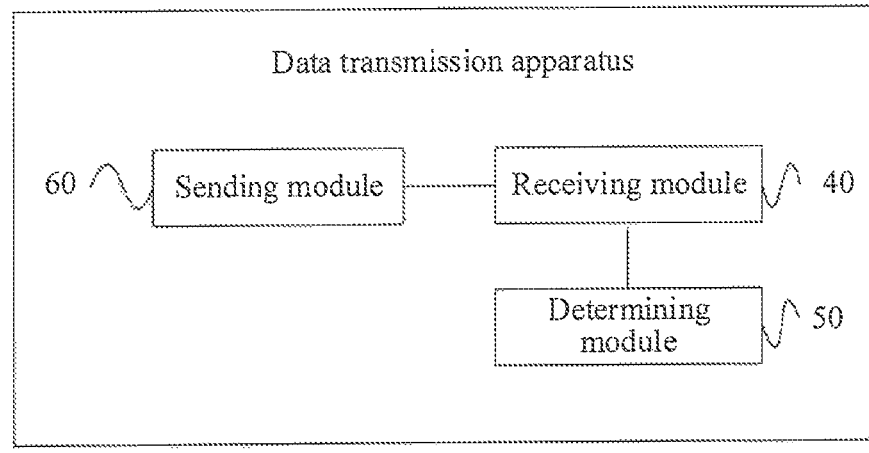
FIG. 7 is a schematic structural diagram of a data transmission apparatus according to Embodiment 6 of the present invention.

FIG. 7 is a schematic structural diagram of a data transmission apparatus according to Embodiment 6 of the present invention. As shown in FIG. 7, the apparatus in this embodiment may include:

a receiving module 40 configured to receive, in a detection period, a second pilot signal sent by a remote control, the second pilot signal being an uplink signal obtained by modulating a useful signal at a preset candidate frequency, and the preset candidate frequency including a frequency in a same frequency band and/or different frequency bands;

a determining module 50 configured to determine an uplink operating frequency from the preset candidate frequency according to the second pilot signal; and a sending module 60 configured to send a second feedback signal to the remote control, the second feedback signal including information about the uplink operating frequency, and the receiving module 40 being further configured to receive uplink data sent by the remote control and modulated at the uplink operating frequency.

Optionally, the same frequency band and/or different frequency bands include/includes more than one frequency band of 2.4 GHz, 900 MHz and 5.8 GHz.

Optionally, the determining module 50 is specifically configured to:

obtain a power and a noise power of the useful signal in the second pilot signal to obtain a signal-to-noise ratio of the preset candidate frequency corresponding to the second pilot signal; and use a preset candidate frequency with a maximum signal-to-noise ratio in the preset candidate frequency corresponding to the second pilot signal as the uplink operating frequency.

In this embodiment, the technical solution in the method shown in FIG. 3 may be performed, and an implementation process and a technical effect thereof are similar to those of the above method. Details are not described herein again.

Figure 8:
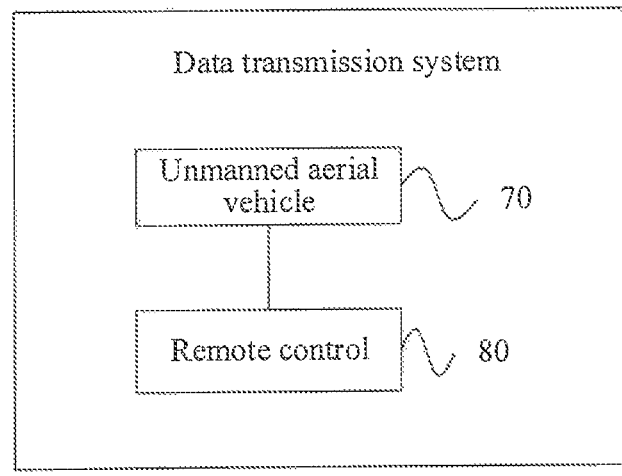
FIG. 8 is a schematic structural diagram of a data transmission system according to Embodiment 7 of the present invention.

FIG. 8 is a schematic structural diagram of a data transmission system according to Embodiment 7 of the present invention. As shown in FIG. 8, the systems in this embodiment may include:

a UAV 70 and a remote control 80; where a wireless signal is transmitted between the UAV 70 and the remote control 80 through at least two independent communication links;

the UAV 70 is configured to perform the technical solutions in the methods shown in FIG. 3 and FIG. 5; and the remote control 80 is configured to perform the technical solutions in the methods shown in FIG. 2 and FIG. 4.

In this embodiment, the technical solutions in the methods shown in FIG. 2 to FIG. 5 may be perform, and implementation processes and technical effects thereof are similar to those of the above method. Details are not described herein again.

Figure 9:
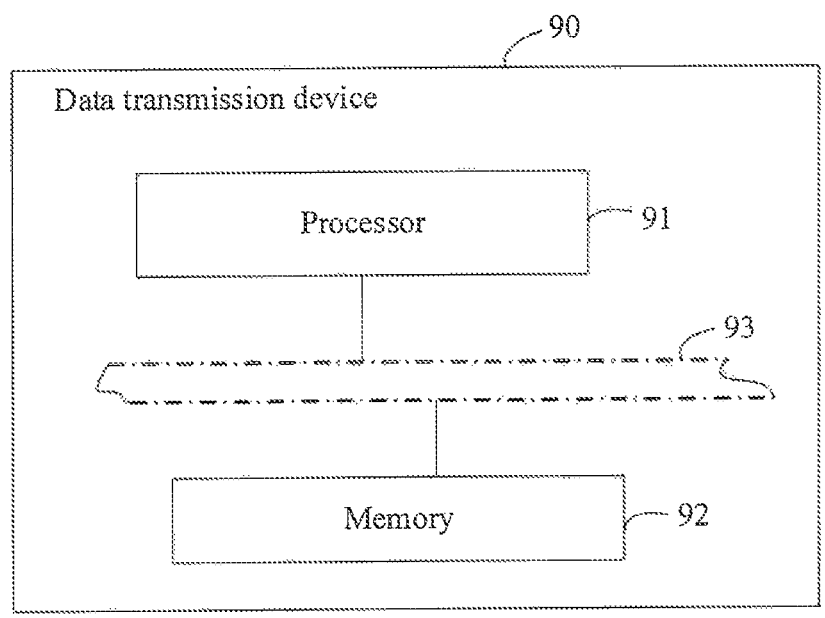
FIG. 9 is a schematic structural diagram of a data transmission device according to Embodiment 8 of the present invention.

FIG. 9 is a schematic structural diagram of a data transmission device according to Embodiment 8 of the present invention. As shown in FIG. 9, a data transmission device 90 in this embodiment includes:

a processor 91 and a memory 92, where the memory 92 is configured to store an executable instruction, and the memory may be a flash memory. In an embodiment, the memory 92 may include more than two memories, and the more than two memories may be respectively disposed in a UAV and a remote control.

The processor 91 is configured to execute the executable instruction stored in the memory to implement the steps of the method in the foregoing embodiment. For details, refer to related descriptions in the foregoing method embodiment. In an embodiment, the processor 91 may include more than two processors, and the more than two processors may be respectively disposed in a UAV and a remote control. The processor disposed in the UAV is configured to implement the steps of the method in the above embodiment that are performed by the UAV. The processor disposed in the remote control is configured to implement the steps of the method in the above embodiment that are performed by the remote control.

Optionally, the memory 92 may be independent or integrated with the processor 91.

When the memory 92 is a component independent of the processor 91, the data transmission device 90 may further include:

a bus 93 configured to connect the memory 92 and the processor 91.

In addition, an embodiment of this application further provides a computer-readable storage medium, the computer-readable storage medium storing a computer-executable instruction, the computer-executable instruction, when executed by at least one processor of user equipment, causing the user equipment to perform the foregoing various possible methods.

The computer-readable medium includes a computer storage medium and a communications medium, where the communications medium includes any medium that enables a computer program to be transmitted from one place to another. The storage medium may be any available medium accessible to a general-purpose or dedicated computer. For example, a storage medium is coupled to a processor, so that the processor can read information from the storage medium or write information into the storage medium. Certainly, the storage medium may be a component of the processor. The processor and the storage medium may be located in an application specific integrated circuit (ASIC). In addition, the ASIC may be located in the user equipment. Certainly, the processor and the storage medium may be used as discrete assemblies existing in a communication device.

A person of ordinary skill in the art may understand that all or some of the steps of the method embodiments may be implemented by a program instructing relevant hardware. The program may be stored in a computer-readable storage medium. When the program is run, the steps of the method embodiments are performed. The foregoing storage medium includes any medium that can store program code, such as a ROM, a RAM, a magnetic disk, or an optical disc.

Finally, it should be noted that the foregoing embodiments are merely used for describing the technical solutions of the present invention, but are not intended to limit the present invention. Although the present invention is described in detail with reference to the foregoing embodiments, it should be appreciated by a person skilled in the art that, modifications may still be made to the technical solutions recorded in the foregoing embodiments, or equivalent replacements may be made to the part of all of the technical features; and these modifications or replacements will not cause the essence of corresponding technical solutions to depart from the scope of the technical solutions in the embodiments of the present invention.

What is claimed is:

1. A data transmission method, comprising:

in a detection period, receiving a first pilot signal sent by an unmanned aerial vehicle (UAV), the first pilot signal being a downlink signal obtained by modulating a useful signal at a preset candidate frequency, and the preset candidate frequency comprising a frequency in a same frequency band and/or different frequency bands;

selecting at least two preset candidate frequencies from the same frequency band and/or different frequency bands, where each frequency band corresponds to one independent communication link a time division duplex mode being adopted for communication on the communication link; and a quantity of selected preset candidate frequencies and a detection order of the selected preset candidate frequencies can be defined and a quantity of communication links can be increased or decreased according to a quantity of applicable frequency bands;

determining a downlink operating frequency from the preset candidate frequency according to the first pilot signal;

sending a first feedback signal to the UAV, the first feedback signal comprising information about the downlink operating frequency; and receiving downlink data sent by the UAV and modulated at the downlink operating frequency wherein the same frequency band and/or different frequency bands comprise/comprises more than one frequency band of 2.4 GHz, 900 MHz and 5.8 GHz;

wherein the determining a downlink operating frequency from the preset candidate frequency according to the first pilot signal comprises:
obtaining a power and a noise power of the useful signal in the first pilot signal to obtain a signal-to-noise ratio of the preset candidate frequency corresponding to the first pilot signal; and
using a preset candidate frequency with a maximum signal-to-noise ratio in the preset candidate frequency corresponding to the first pilot signal as the downlink operating frequency;
in a detection period, receiving a second pilot signal sent by a remote control, the second pilot signal being an uplink signal obtained by modulating a useful signal at a preset candidate frequency, and the preset candidate frequency comprising a frequency in a same frequency band and/or different frequency bands;
selecting at least two preset candidate frequencies from the same frequency band and/or different frequency bands, where each frequency band corresponds to one independent communication link a time division duplex mode being adopted for communication on the communication link; and
a quantity of selected preset candidate frequencies and a detection order of the selected preset candidate frequencies can be defined and a quantity of communication links can be increased or decreased according to a quantity of applicable frequency bands;
determining an uplink operating frequency from the preset candidate frequency according to the second pilot signal;
sending a second feedback signal to the remote control, the second feedback signal comprising information about the uplink operating frequency; and
receiving uplink data sent by the remote control and modulated at the uplink operating frequency;
wherein the determining an uplink operating frequency from the preset candidate frequency according to the second pilot signal comprises:
obtaining a power and a noise power of the useful signal in the second pilot signal to obtain a signal-to-noise ratio of the preset candidate frequency corresponding to the second pilot signal; and
using a preset candidate frequency with a maximum signal-to-noise ratio in the preset candidate frequency corresponding to the second pilot signal as the uplink operating frequency.

2. A data transmission method, wherein a quantity of selected preset candidate frequencies and a detection order of the selected preset candidate frequencies can be defined and a quantity of communication links may be increased or decreased according to a quantity of applicable frequency bands, the method comprising:
in a detection period, receiving a first pilot signal sent by an unmanned aerial vehicle (UAV), the first pilot signal being a downlink signal obtained by modulating a useful signal at a preset candidate frequency, and the preset candidate frequency comprising a frequency in a same frequency band and/or different frequency bands;
selecting at least two preset candidate frequencies from the same frequency band and/or different frequency bands, where each frequency band corresponds to one independent communication link a time division duplex mode being adopted for communication on the communication link; and a quantity of selected preset candidate frequencies and a detection order of the selected preset candidate frequencies can be defined and a quantity of communication links can be increased or decreased according to a quantity of applicable frequency bands;
determining a downlink operating frequency from the preset candidate frequency according to the first pilot signal;
sending a first feedback signal to the UAV, the first feedback signal comprising information about the downlink operating frequency; and
receiving downlink data sent by the UAV and modulated at the downlink operating frequency;
wherein the determining a downlink operating frequency from the preset candidate frequency according to the first pilot signal comprises:
obtaining a power and a noise power of the useful signal in the first pilot signal to obtain a signal-to-noise ratio of the preset candidate frequency corresponding to the first pilot signal; and
using a preset candidate frequency with a maximum signal-to-noise ratio in the preset candidate frequency corresponding to the first pilot signal as the downlink operating frequency;
in a detection period, receiving a second pilot signal sent by a remote control, the second pilot signal being an uplink signal obtained by modulating a useful signal at a preset candidate frequency, and the preset candidate frequency comprising a frequency in a same frequency band and/or different frequency bands;
selecting at least two preset candidate frequencies from the same frequency band and/or different frequency bands, where each frequency band corresponds to one independent communication link a time division duplex mode being adopted for communication on the communication link; and a quantity of selected preset candidate frequencies and a detection order of the selected preset candidate frequencies can be defined and a quantity of communication links can be increased or decreased according to a quantity of applicable frequency bands;
determining an uplink operating frequency from the preset candidate frequency according to the second pilot signal;
sending a second feedback signal to the remote control, the second feedback signal comprising information about the uplink operating frequency; and
receiving uplink data sent by the remote control and modulated at the uplink operating frequency;
wherein the same frequency band and/or different frequency bands comprise/comprises more than one frequency band of 2.4 GHz, 900 MHz and 5.8 GHz;
wherein the determining an uplink operating frequency from the preset candidate frequency according to the second pilot signal comprises:
obtaining a power and a noise power of the useful signal in the second pilot signal to obtain a signal-to-noise ratio of the preset candidate frequency corresponding to the second pilot signal; and
using a preset candidate frequency with a maximum signal-to-noise ratio in the preset candidate frequency corresponding to the second pilot signal as the uplink operating frequency.

3. A data transmission system, wherein a quantity of selected preset candidate frequencies and a detection order of the selected preset candidate frequencies can be defined and a quantity of communication links may be increased or decreased according to a quantity of applicable frequency bands, the system comprising an unmanned aerial vehicle (UAV) and a remote control, the UAV being configured to:
in a detection period, receive a second pilot signal sent by a remote control, the second pilot signal being an uplink signal obtained by modulating a useful signal at a preset candidate frequency, and the preset candidate frequency comprising a frequency in a same frequency band and/or different frequency bands;
select at least two preset candidate frequencies from the same frequency band and/or different frequency bands, where each frequency band corresponds to one independent communication link a time division duplex mode being adopted for communication on the communication link;
determine an uplink operating frequency from the preset candidate frequency according to the second pilot signal;
send a second feedback signal to the remote control, the second feedback signal comprising information about the uplink operating frequency; and
receive uplink data sent by the remote control and modulated at the uplink operating frequency;
wherein the same frequency band and/or different frequency bands comprise/comprises more than one frequency band of 2.4 GHz, 900 MHz and 5.8 GHz;
wherein the determining a downlink operating frequency from the preset candidate frequency according to the first pilot signal comprises:
obtaining a power and a noise power of the useful signal in the first pilot signal to obtain a signal-to-noise ratio of the preset candidate frequency corresponding to the first pilot signal; and
using a preset candidate frequency with a maximum signal-to-noise ratio in the preset candidate frequency corresponding to the first pilot signal as the downlink operating frequency;

the remote control being configured to:
in a detection period, receive a first pilot signal sent by an unmanned aerial vehicle (UAV), the first pilot signal being a downlink signal obtained by modulating a useful signal at a preset candidate frequency, and the preset candidate frequency comprising a frequency in a same frequency band and/or different frequency bands;
select at least two preset candidate frequencies from the same frequency band and/or different frequency bands, where each frequency band corresponds to one independent communication link a time division duplex mode being adopted for communication on the communication link;
determine a downlink operating frequency from the preset candidate frequency according to the first pilot signal;
send a first feedback signal to the UAV, the first feedback signal comprising information about the downlink operating frequency; and
receive downlink data sent by the UAV and modulated at the downlink operating frequency;
wherein the determining an uplink operating frequency from the preset candidate frequency according to the second pilot signal comprises:
obtaining a power and a noise power of the useful signal in the second pilot signal to obtain a signal-to-noise ratio of the preset candidate frequency corresponding to the second pilot signal; and
using a preset candidate frequency with a maximum signal-to-noise ratio in the preset candidate frequency corresponding to the second pilot signal as the uplink operating frequency.

* * * * *